(12) United States Patent
Athad

(10) Patent No.: US 11,597,019 B2
(45) Date of Patent: Mar. 7, 2023

(54) SLOTTING TOOL BODY HAVING INSERT RECEIVING SLOTS CONNECTED BY FLEXIBILITY RECESS AND ROTARY SLOT CUTTING TOOL HAVING SAME

(71) Applicant: ISCAR, LTD., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 17/306,062

(22) Filed: May 3, 2021

(65) Prior Publication Data
US 2022/0347769 A1    Nov. 3, 2022

(51) Int. Cl.
B23C 5/10    (2006.01)
B23C 5/08    (2006.01)

(52) U.S. Cl.
CPC .............. B23C 5/1072 (2013.01); B23C 5/08 (2013.01)

(58) Field of Classification Search
CPC ............ B23C 2210/02; B23C 2210/74; B23C 2210/161; B23C 5/2309; B23C 5/2298; B23C 5/226; B23C 5/1072; B23C 5/08
See application file for complete search history.

(56) References Cited

U.S. PATENT DOCUMENTS

| | | | | |
|---|---|---|---|---|
| 4,292,866 | A * | 10/1981 | Kaczynski | B23B 29/20 279/2.03 |
| 4,993,890 | A * | 2/1991 | Tukala | B23C 5/2252 407/34 |
| 5,059,069 | A * | 10/1991 | Lagerberg | B23B 27/065 82/13 |
| 5,159,863 | A | 11/1992 | Simpson, III | |
| 5,820,309 | A * | 10/1998 | Mihic | B23D 61/025 407/50 |
| 5,833,403 | A | 11/1998 | Barazani | |
| 6,116,823 | A * | 9/2000 | Mihic | B23C 5/2239 407/53 |
| 6,604,894 | B1 | 8/2003 | Noggle | |

(Continued)

FOREIGN PATENT DOCUMENTS

| | | |
|---|---|---|
| EP | 3144086 | 3/2017 |
| JP | 2006-263845 | 10/2006 |

OTHER PUBLICATIONS

International Search Report dated Aug. 4, 2022, issued in PCT counterpart application (No. PCT/IL2022/050368).

(Continued)

*Primary Examiner* — Nicole N Ramos
(74) *Attorney, Agent, or Firm* — Womble Bond Dickinson (US) LLP

(57) ABSTRACT

A slotting tool body includes a disc-like cutter portion including opposing forward and rearward cutter portion side surfaces and a cutter portion peripheral surface extending therebetween and a shank portion projecting rearwardly from the rearward cutter portion side surface. The cutter portion includes a number N of angularly spaced apart clamping portions, each having a peripherally disposed insert receiving slot. The cutter portion further includes a flexibility recess recessed in the forward cutter portion side surface and extending to each of the insert receiving slots. A cutting insert is releasably and resiliently clamped in each insert receiving slot to form a rotary slot cutting tool.

31 Claims, 6 Drawing Sheets

(56) References Cited

U.S. PATENT DOCUMENTS

| | | | |
|---|---|---|---|
| 8,696,254 B2 * | 4/2014 | Satran | ............... B23C 5/2213 407/34 |
| 2010/0067992 A1 | 3/2010 | Uchijo et al. | |
| 2013/0294854 A1 | 11/2013 | Lee | |
| 2017/0333997 A1 | 11/2017 | Kusuda | |
| 2019/0160555 A1 | 5/2019 | Hecht et al. | |
| 2020/0298319 A1 | 9/2020 | Hecht et al. | |

OTHER PUBLICATIONS

Written Opinion dated Aug. 4, 2022, issued in PCT counterpart application (No. PCT/IL2022/050368).

\* cited by examiner

SLOTTING TOOL BODY HAVING INSERT RECEIVING SLOTS CONNECTED BY FLEXIBILITY RECESS AND ROTARY SLOT CUTTING TOOL HAVING SAME

FIELD OF THE INVENTION

The subject matter of the present application relates to rotary slot cutting tools having a slotting tool body with a disc-like cutter portion having a plurality of circumferentially disposed insert receiving pockets, for releasably retaining a cutting insert therein, in general, and to such slotting tool bodies where the insert receiving pocket resiliently clamps the cutting insert therein, in particular.

BACKGROUND OF THE INVENTION

Rotary slot cutting tools can have a slotting tool body that has a disc-like cutter portion and a shank portion that extends rearwardly from the disc-like cutter portion. The disc-like cutter portion can be provided with a plurality of circumferentially disposed insert, receiving pockets for retaining a cutting insert therein. The cutting insert can be retained in the insert receiving pocket by a resilient clamping member. An example of such a rotary cutting tool is disclosed in, for example, US 2019/0160555 A1, disclosing a slotting tool body which includes a disc-like cutter portion and a shank portion projecting rearwardly therefrom. The cutter portion includes a plurality of resilient clamping portions having a peripherally disposed insert receiving slot. The disc-like cutter portion has a certain flexibility that decreases with each sequential insertion of cutting inserts into respective insert, receiving slots. In particular in cutting tools having a small diameter, said flexibility can be reduced to such an extent that the resilient member(s) cannot be displaced sufficiently to insert the last cutting insert(s).

SUMMARY OF THE INVENTION

In accordance with a first aspect of the subject matter of the present application there is provided a slotting tool body, having a body central axis that defines opposite forward and rearward directions and about which the slotting tool body is rotatable in a rotational direction, the slotting tool body comprising:
  a disc-like cutter portion comprising:
  opposing forward and rearward cutter portion side surfaces and a cutter portion peripheral surface extending therebetween;
  a number N of angularly spaced apart clamping portions, where N is an integer greater than 1, each clamping portion having a peripherally disposed insert receiving slot which opens out to the forward and rearward cutter portion side surfaces and the cutter portion peripheral surface; and
  a resilient clamping member and a lower jaw member which oppose each other and which are spaced apart by the insert receiving slot, the resilient clamping member being configured to resiliently retain a cutting insert in the insert receiving slot; and
  a shank portion projecting rearwardly from the rearward cutter portion side surface, the shank portion comprising a shank peripheral surface which extends circumferentially about the body central axis; wherein:
  the cutter portion further comprises a flexibility recess recessed in the forward cutter portion side surface and extending to each of the insert receiving slots.

In accordance with a second aspect of the subject matter of the present application there is provided a rotary slot cutting tool comprising:
  a slotting tool body of the type described above; and
  a cutting insert, releasably and resiliently clamped in each of the insert receiving slots by one of the resilient clamping members.

It is understood that the above-said is a summary, and that features described hereinafter may be applicable in any combination to the subject matter of the present application, for example, any of the following features may be applicable to the slotting tool body and the rotary slot cutting tool:

The cutter portion can be divided into a number N of cutter sub-portions. In a median cutter radial plane through both the flexibility recess and the cutter portion peripheral surface, the cutter sub-portions can be spaced apart from each other.

The flexibility recess can exhibit N-fold rotational symmetry about the body central axis.

The flexibility recess can extend in the rearward direction, past the rearward cutter portion side surfaces and into the shank portion.

The flexibility recess can be intersected by the body central axis.

The flexibility recess can transition into each insert receiving slot at a respective narrowing neck portion.

The flexibility recess can be blind, and open out only to the forward cutter portion side surface.

Each insert receiving slot can be defined by an elongated slot peripheral surface having ends that extend to the cutter portion peripheral surface. The flexibility recess can comprise a recess base surface connecting the insert receiving slots, and a number N of recess peripheral wall surfaces, each of which extends from the recess base surface to the forward cutter portion side surface between the slot peripheral surfaces of two circumferentially adjacent insert receiving slots.

The recess base surface can be oriented perpendicular to the body central axis. The recess peripheral wall surfaces can be oriented parallel to the body central axis.

The recess base surface can intersect with each of the recess peripheral wall surfaces at an intersection which forms a fillet.

The slotting tool body can further comprise an annular groove formed at an intersection of the rearward cutter portion side surface and the shank peripheral surface.

The cutter portion and the shank portion can be integrally formed so that the slotting tool body has a unitary, one-piece construction.

For any given clamping portion, the resilient clamping member can be arranged ahead of the lower jaw member in the rotational direction.

The shank portion can comprise a number N of angularly spaced apart forward shank recesses recessed in, and opening out to, the shank peripheral surface adjacent to the cutter portion. A radially inward portion of each insert receiving slot, can merge on one side thereof with a respective forward shank recess.

The resilient clamping member of each clamping portion can be axially adjacent a respective forward shank recess.

The shank portion can further comprise a number N of peripherally disposed angularly spaced apart non-recessed forward shank portions which can circumferentially alternate with the forward shank recesses and can be axially adjacent the cutter portion.

In a direction along the body central axis, an imaginary radius line extending between the body central axis and the shank peripheral surface can define a shank portion radius of an imaginary shank portion circle that is centered at the body central axis and has a shank portion diameter. The cutter portion can define an imaginary circumscribed cutter portion circle that is centered at the body central axis and that has a cutter portion diameter.

In a direction along the body central axis, the imaginary shank portion circle can intersect all the insert receiving slots.

Each insert receiving slot can be defined by an elongated slot peripheral surface comprising a slot lower jaw abutment surface located on the lower jaw member. In a direction along the body central axis, the imaginary shank portion circle can intersect the slot lower jaw abutment surface.

The slot peripheral surface can further comprise a slot clamping member abutment surface located on the resilient clamping member. In a direction along the body central axis (B), the slot clamping member abutment surface can be located radially outside the imaginary shank portion circle.

In an end view of the slotting tool body along the body central axis, the slot lower jaw abutment surface and the slot clamping member abutment surface can converge towards each other in a direction towards the flexibility recess, defining an acute slot abutment angle.

The cutter portion can be divided into a number N of cutter sub-portions. Each clamping portion can comprise a stop member which is located circumferentially between the resilient clamping member and the lower jaw member. The stop member and the resilient clamping member can be located on the same cutter sub-portion.

N can satisfy the condition: $2 \leq N \leq 9$. The cutter portion can define an imaginary circumscribed cutter portion circle that is centered at the body central axis and that has a cutter portion diameter. The cutter portion diameter can be less than or equal to 35 mm.

N can satisfy the condition: $N=3$. The cutter portion diameter can be approximately equal to 20 mm.

The cutting insert can be longitudinally elongated in a direction defining an insert longitudinal axis, the cutting insert comprising opposing insert upper and lower surfaces and an insert peripheral surface extending therebetween, the insert peripheral surface comprising two opposing insert end surfaces connecting the insert upper and lower surfaces and two opposing insert side surfaces also connecting the insert upper and lower surfaces. The cutting insert can comprise an insert longitudinal plane containing the insert longitudinal axis, passing between the insert side surfaces, and intersecting the insert upper and lower surfaces and also intersecting the opposite insert end surfaces. The cutting insert can comprise a cutting portion located at one end of the cutting insert, the cutting portion comprising a cutting edge formed at the intersection of the insert upper surface and one of the two insert end surfaces. The insert upper and lower surfaces can comprise insert upper and lower abutment surfaces, respectively. The insert receiving slot can be defined by an elongated slot peripheral surface comprising a slot lower jaw abutment surface located on the lower jaw member. The slot peripheral surface can further comprise a slot clamping member abutment surface located on the resilient clamping member. The slot clamping member abutment surface can abut the insert upper abutment surface. The slot lower jaw abutment surface can abut the insert lower abutment surface.

The insert end surface opposite the cutting portion can further comprise an insert stop surface which is closer to the insert upper surface than to insert lower surface, the insert stop surface being planar. Each clamping portion can comprise a stop member which is located circumferentially between the resilient clamping member and the lower jaw member. The cutter portion can be divided into a number N of cutter sub-portions. The stop member and the resilient clamping member can be located on the same cutter sub-portion. The slot peripheral surface can further comprise a slot radial stop surface located on the stop member. The slot radial stop surface can abut the insert stop surface.

The cutting insert can comprise an additional cutting portion such that the cutting insert includes two cutting portions, an active cutting portion and a non-active cutting portion, the two cutting portions being formed at opposite ends of the cutting insert. The insert upper surface can include an additional insert upper abutment surface, such that the insert upper surface includes two insert upper abutment surfaces, an active and non-active insert upper abutment surface, the active insert upper abutment surface being located further from the active cutting portion than the non-active insert upper abutment surface, with the slot clamping member abutment surface abutting the active insert upper abutment surface. The insert end surface at the active cutting portion can include an additional insert stop surface, such that the cutting insert includes two insert stop surfaces, an active and non-active insert stop surface, the active insert stop surface being located at the non-active cutting portion, with the slot radial stop surface abutting the active insert stop surface.

BRIEF DESCRIPTION OF THE FIGURES

For a better understanding of the present application and to show how the same may be carried out in practice, reference will now be made to the accompanying drawings, in which.

Figure 1:
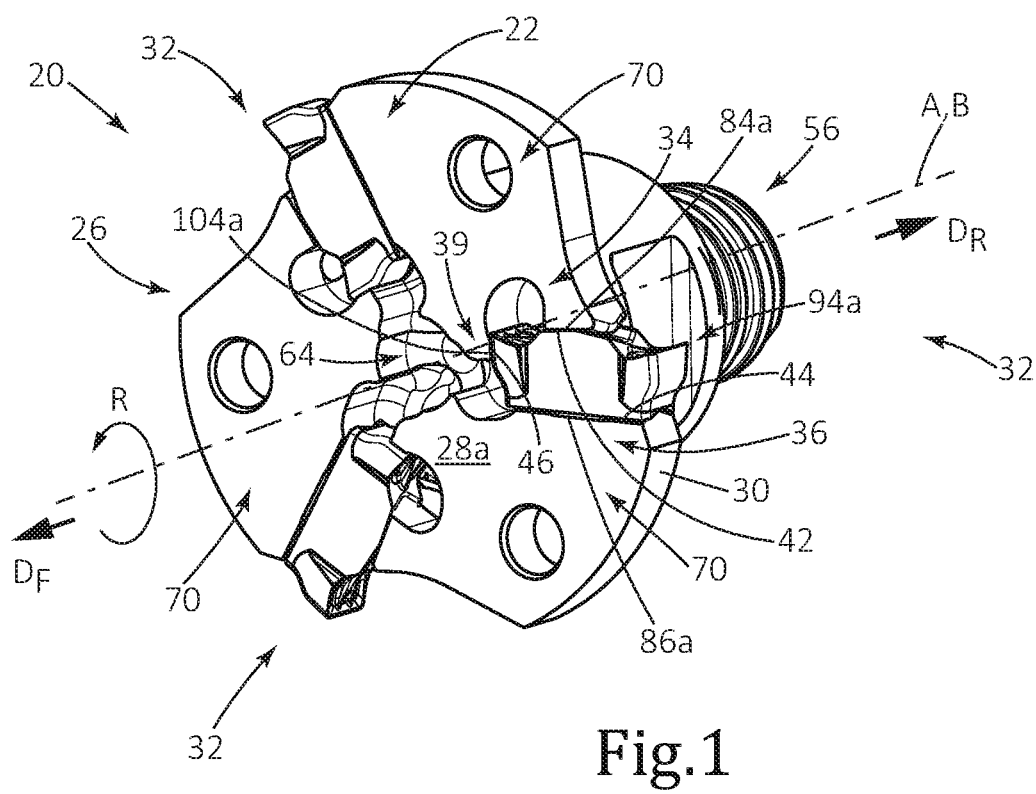
FIG. 1 is a forward perspective view of a rotary slot cutting tool, with cutting inserts resiliently clamped in insert receiving slots, in accordance with the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
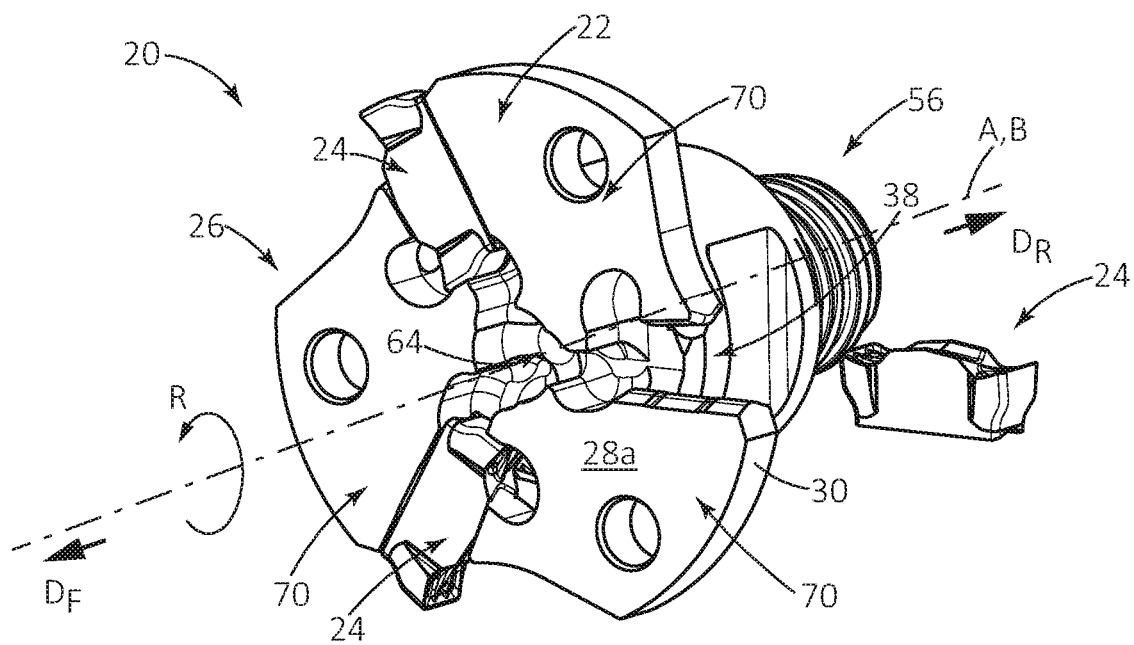
FIG. 2 is an exploded perspective view of the rotary slot cutting tool shown in FIG. 1.

Attention is first drawn to FIGS. 1 and 2, showing a rotary slot cutting tool 20, depicting an aspect of the present application, having a tool central axis A, suitable for slotting cutting operations. The rotary slot cutting tool 20 may exhibit rotational symmetry about the tool central axis A. The rotary slot cutting tool 20 has a slotting tool body 22 which can be typically made from steel. The rotary slot cutting tool 20 has a cutting insert 24 which can be typically made from cemented carbide. The cutting insert 24 is releasably attached to the slotting tool body 22.

It is noted that the term "rotary slot cutting tool" as used herein may be replaced with other terms applicable in the metal cutting field for such cutting tools, for example, "slotting cutter", "slot milling cutter", "slitting cutter", "grooving cutter", "slot mill cutter", "groove milling cutter", "side milling cutter", "disc milling cutter", and the like.

Figure 3:
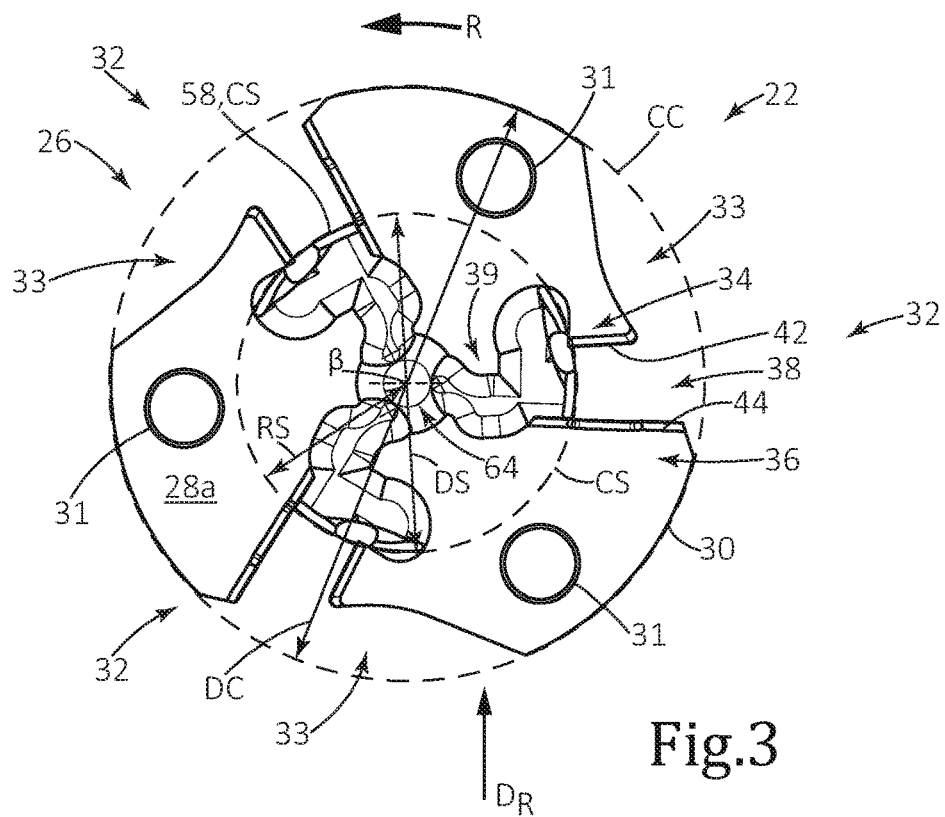
FIG. 3 is a forward view of a slotting tool body in FIG. 1.
Figure 4:
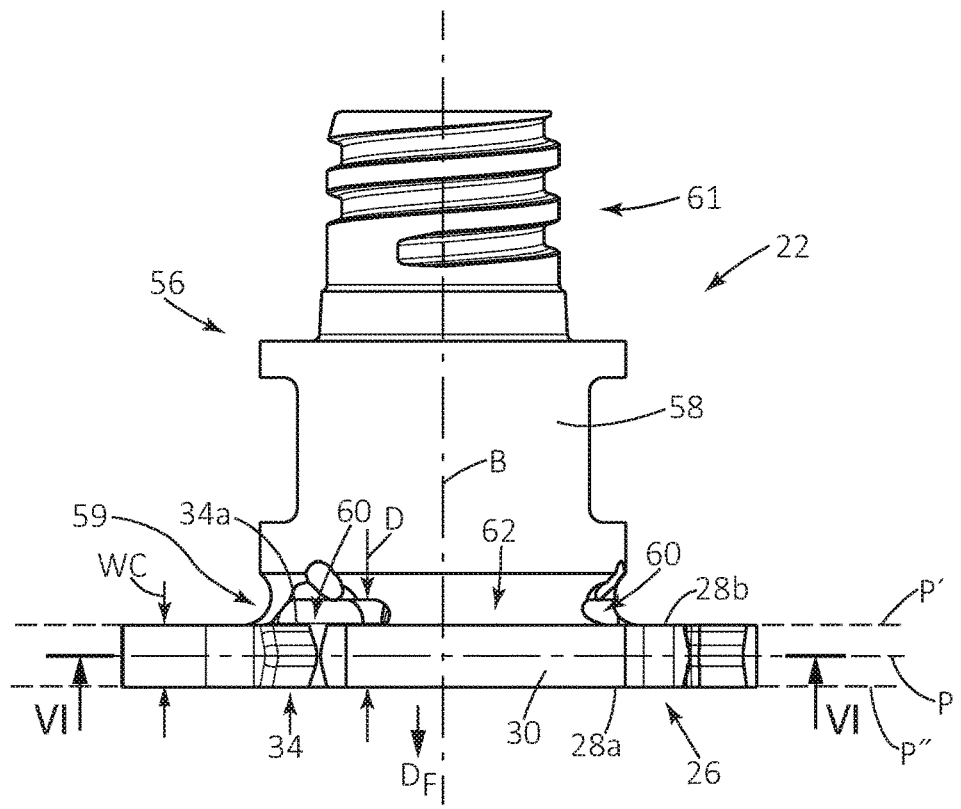
FIG. 4 is a side view of the slotting tool body in FIG. 3.

Reference is now made also to FIGS. 3 and 4, showing another aspect of the subject matter of the present application, relating to the slotting tool body 22. The slotting tool body 22 has a body central axis B that is co-incident with the tool central axis A. The body central axis B defines opposite forward and rearward directions $D_F$, $D_R$. The body central axis B forms an axis of rotation about which the slotting tool body 22 is rotatable in a rotational direction R.

It should be appreciated that use of the terms "forward" and "rearward" throughout the description and claims refer to a relative position in a direction of the body central axis B downwardly and upwardly, respectively, in FIG. 4. Moreover, the terms "axial" and "radial" are with respect to the tool central axis B, unless specified otherwise.

As shown in FIG. 3, the slotting tool body 22 includes a disc-like cutter portion 26. The cutter portion 26 includes opposing forward and rearward cutter portion side surfaces 28a, 28b and a cutter portion peripheral surface 30 that extends between the forward and rearward cutter portion side surfaces 28a, 28b. As seen in the side view of FIG. 4, the rearward cutter portion side surface 28b defines a rear cutter radial plane P' and the forward cutter portion side surface 28a defines a forward cutter radial plane P'''. The cutter portion peripheral surface 30 extends circumferentially about the body central axis B. The body central axis B intersects the forward and rearward cutter portion side surfaces 28a, 28b at a central portion thereof. In a forward view of the slotting tool body 22, in a direction along the body central axis B (i.e. FIG. 3), the cutter portion 26 defines an imaginary circumscribed cutter portion circle CC that is centered at the body central axis B and that has a cutter portion diameter DC.

As shown in FIG. 4, in the axial direction, measured between the forward and rearward cutter portion side surfaces 28a, 28b, or more specifically between the corresponding radial planes P', P''', the cutter portion 26 has a cutter portion width WC. In accordance with some embodiments of the subject matter of the present application, the forward and rearward cutter portion side surfaces 28a, 28b can be planar and perpendicular to the body central axis B.

The cutter portion 26 includes a number N of clamping portions 32, angularly spaced apart about the body central axis B, where N is an integer greater than 1. The number N of clamping portions 32 can be arranged at the same axial position along the body central axis B in the forward-to-rearward direction. As seen in FIG. 3, each clamping portion 32 can have a chip gullet 33 at the cutter portion peripheral surface 30, so that the cutter portion 26 may not be completely circular in a forward view.

Figure 5:
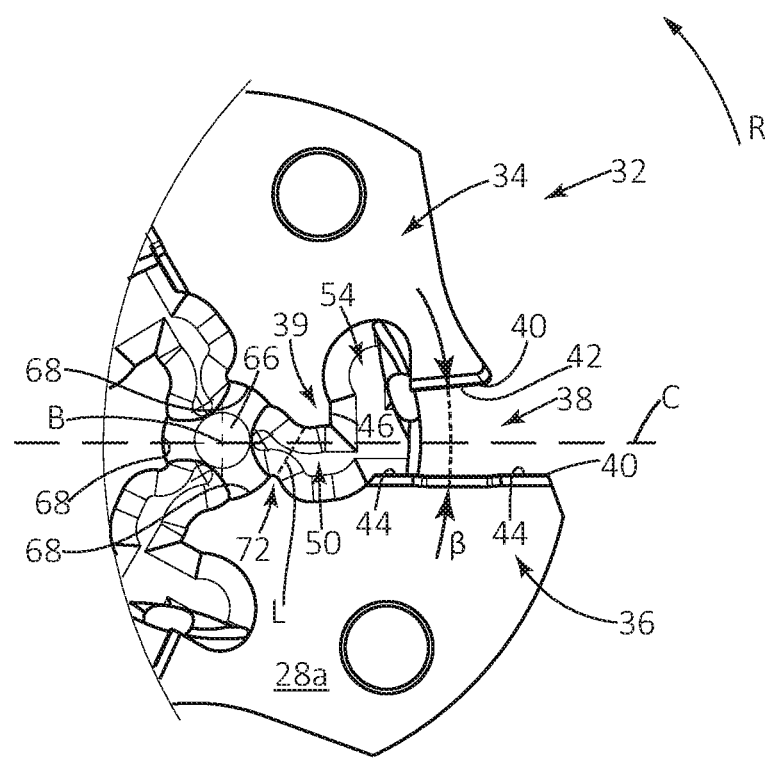
FIG. 5 is a detail of FIG. 3.

Referring to FIG. 5, each clamping portion 32 includes a resilient clamping member 34 and a lower jaw member 36 which are opposite each other and spaced apart from one another by an insert receiving slot 38. That is to say, the insert receiving slot 38 is formed between the resilient clamping member 34 and the lower jaw member 36. The insert receiving slot 38 extends along an insert receiving slot axis C, such that in a forward view of the slotting tool body 22 the resilient clamping member 34 and the lower jaw member 36 are located on opposite sides of the insert receiving slot axis C. The resilient clamping member 34 is arranged ahead of the lower jaw member 36 and the insert receiving slot 38 in the rotational direction R. The resilient clamping member 34 is configured to resiliently retain the cutting insert 24 in the insert receiving slot 38. The resilient clamping member 34 is resiliently displaceable relative to the lower jaw member 36. In other words, each clamping portion 32 is resilient. It is noted that each clamping portion 32 is devoid of a resilience slot located rotationally forward of the resilient clamping member 34 as disclosed in U.S. Pat. Nos. 6,116,823 and 8,388,270. It is further noted that each insert receiving slot 38 is devoid of threaded hole (for releasably attaching the cutting insert to the cutter portion by use of a threaded clamping screw).

In accordance with some embodiments of the subject matter of the present application, each clamping portion 32 can include a stop member 39 which can be located circumferentially between the resilient clamping member 34 and the lower jaw member 36. Generally speaking, the stop member 39 is radially inward of the resilient clamping member 34 and the lower jaw member 36. The purpose of the stop member 39 is described later in the description.

Reference is further made to FIG. 5, showing a side view of the clamping portion 32 (i.e. perpendicular to the insert receiving slot axis C), the insert receiving slot 38 opens out to the cutter portion peripheral surface 30. Thus, the insert receiving slot 38 is peripherally disposed. Reverting to FIG. 4, the insert receiving slot 38 opens out laterally on both sides to the forward and rearward cutter portion side surfaces 28a, 28b. It is understood the context of "laterally" in reference to the insert receiving slot 38 means perpendicular to the insert receiving slot axis C, and thus generally in a direction parallel to the body central axis B.

Each insert receiving slot 38 is defined by an elongated slot peripheral surface 40 having ends that extend to the cutter portion peripheral surface 30. It is noted that the slot peripheral surface 40 is not continuous, since a flexibility recess extends to the insert receiving slot 38 (so as to interrupt the slot peripheral surface 40), described later in the description. The slot peripheral surface 40 extends between the forward and rearward cutter portion side surfaces 28a, 28b. The slot peripheral surface 40 includes a slot clamping member abutment surface 42 located on the resilient clamping member 34, for abutting a corresponding surface on the cutting insert 24. The slot peripheral surface 40 includes a slot lower jaw abutment surface 44 located on the lower jaw member 36, for abutting a corresponding surface on the cutting insert 24. The slot peripheral surface 40 includes a slot radial stop surface 46, for positioning the cutting insert 24 in an exact predetermined radial position. The slot radial stop surface 46 faces radially outwardly. The slot radial stop surface 46 is located on the stop member 39. In accordance with some embodiments of the subject matter of the present application, the slot radial stop surface 46 can be located circumferentially between the slot clamping member abutment surface 42 and the slot lower jaw abutment surface 44.

Referring to FIG. 5, the insert receiving slot 38 includes a slot key portion 50 formed at a radially an innermost portion of the insert receiving slot 38. One purpose of the slot key portion 50 is to act as a stress relief groove (as is known in the art). However, the slot key portion 50 has a larger dimension than normal stress relief grooves so that it can also serve to receive a displacement prong of a key when extracting the cutting insert 24 from the insert receiving slot 38 (not shown). Moreover, the slot key portion 50 is positioned further rotationally forward than would be normally required if its purpose was only as a stress relief groove. For example, the majority of the insert key portion 50 is located above an extension of the slot lower jaw abutment surface 44. This allows the displacement prong 51a to be able to abut an end of the cutting insert 24, while being located in the slot key portion 50. The insert receiving slot 38 includes a slot resilience portion 54, for providing the desired resilience to the resilient clamping member 34. The slot resilience portion 54 is located rotationally forward from the slot key portion 50.

Referring to FIGS. 2 and 4, the slotting tool body 22 includes a shank portion 56 that projects from the rearward cutter portion side surface 28b. That is to say, the shank portion 56 projects rearwardly from the cutter portion 26. The shank portion 56 includes a shank peripheral surface 58 which extends circumferentially about the body central axis B. In accordance with some embodiments of the subject matter of the present application, the shank portion 56 can be integrally formed with the cutter portion 26 so that the slotting tool body 22 has a unitary, one-piece construction. i.e., the shank portion 56 and the cutter portion 26 are formed (e.g., machined) from a single continuous piece of material. The shank portion 56 can have a generally cylindrical basic shape. The shank portion 56 can have an external thread 61 for engaging an internal thread of a tool holder (not shown). As seen best in FIG. 4, the slotting tool body 22 can include an annular groove 59 formed at an intersection of the rearward cutter portion side surface 28b and the shank peripheral surface 58.

Figure 6:
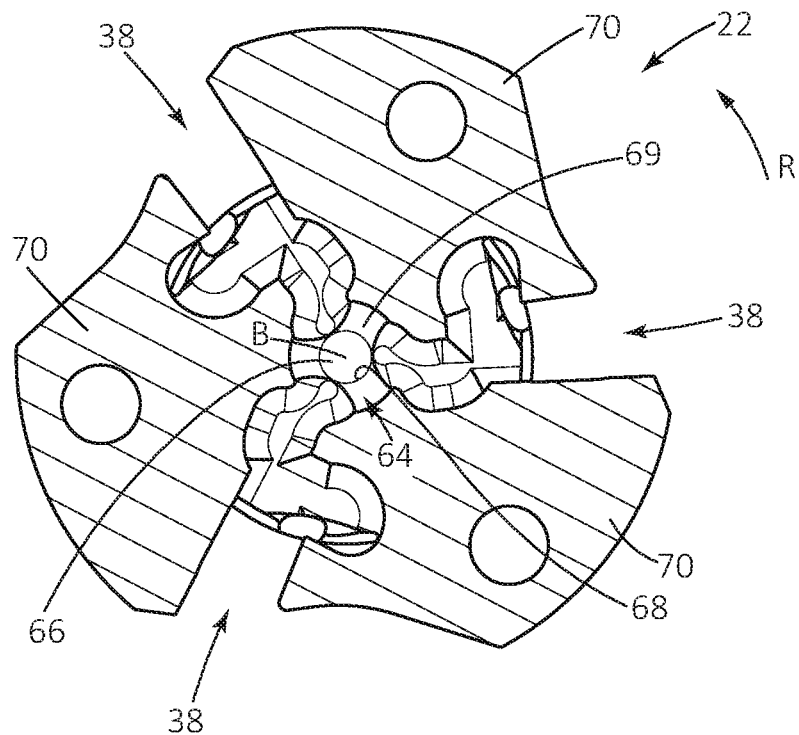
FIG. 6 is a cross-sectional view of the slotting tool body, taken along the line VI-VI in FIG. 4.
Figure 7:
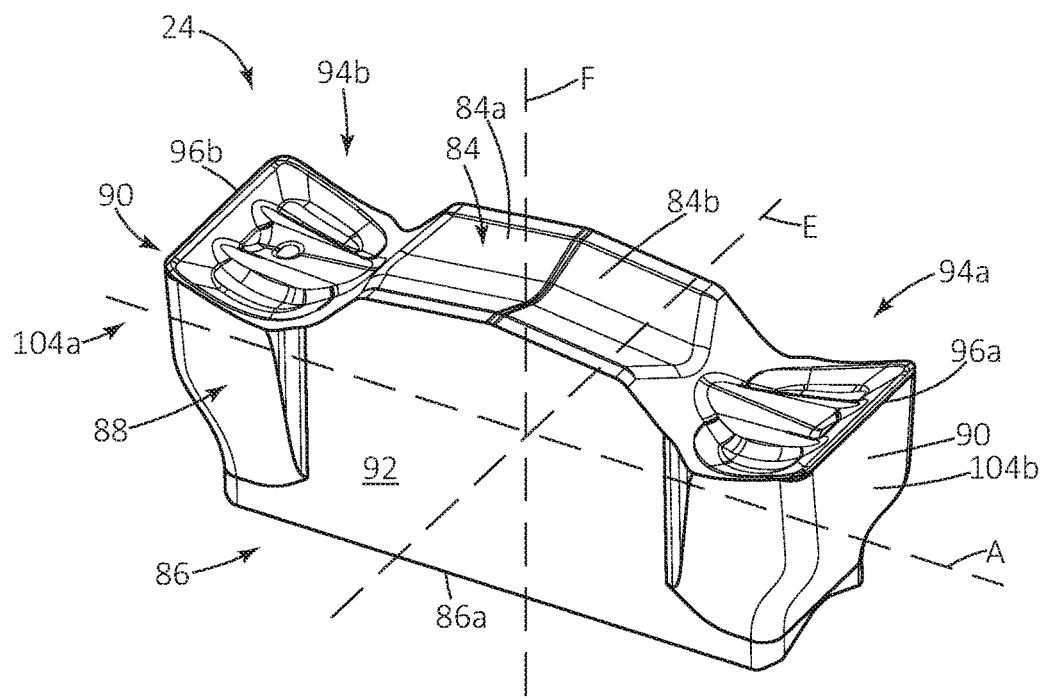
FIG. 7 is a perspective view of a cutting insert, in accordance with the present application.

Reverting back to FIGS. 4 and 6, in accordance with some embodiments of the subject matter of the present application, the shank portion 56 can include a number N of forward shank recesses 60 that are recessed in, and open out to, the shank peripheral surface 58. That is to say, the forward shank recesses 60 can be peripherally disposed, and are radially recessed in the shank peripheral surface 58 proximate a forward end thereof. Each forward shank recess 60 can be axially adjacent the cutter portion 26. In this non-limiting example shown in the drawings, the forward shank recesses 60 are located at a partially annular groove 59. The forward shank recesses 60 can be angularly spaced apart from each other about the body central axis B.

In accordance with some embodiments of the subject matter of the present application, shank portion 56 can include a number N of non-recessed forward shank portions 62 formed by a part of the shank peripheral surface 58 that is non-recessed (notwithstanding the fact that they may be located in the annular groove 59). Like the forward shank recesses 60, the non-recessed forward shank portions 62 can be peripherally disposed. The non-recessed forward shank portions 62 can be located between two circumferentially adjacent forward shank recesses 60 and axially adjacent the cutter portion 26. The number of non-recessed forward shank portions 62 can match the number of forward shank recesses 60. Each non-recessed forward shank portion 62 can be located between two circumferentially adjacent forward shank recesses 60. That is to say, the forward shank recesses 60 and the non-recessed forward shank portions 62 can alternate in a circumferential direction. The non-recessed forward shank portion 62 can be angularly spaced apart from each other about the body central axis B.

As seen in FIG. 3, in a direction along the body central axis B, an imaginary radius line that extends between the body central axis B and the shank peripheral surface 58 defines a shank portion radius RS of an imaginary shank portion circle CS that is centered at the body central axis B and that has a shank portion diameter DS. The imaginary shank portion circle CS is a circumscribed circle defined by the plurality of angularly spaced apart non-recessed forward shank portions 62.

In accordance with some embodiments of the subject matter of the present application, the resilient clamping member 34 of each clamping portion 32 can be axially adjacent a respective forward shank recess 60. That is to say, the free end of the resilient clamping member 34 is not connected to any part of the shank portion 56. As seen in FIG. 4, a rearward facing surface 34a of the clamping member 34 faces the forward shank recess 60. At the forward shank recesses 60, the resilient clamping member 34 is circumferentially cantilevered in a direction opposite the direction of rotation R, relative to a rotationally forward non-recessed forward shank portion 62. Advantageously, this allows the resilient clamping member to 34 to bend slightly when the cutting insert 24 encounters the work piece (along with the lower jaw member 36 and the cutting insert 24) in order to maintain a firm clamping force on the cutting insert 24. A radially inward portion of the lower jaw member 36 can be connected to one of the non-recessed forward shank portions 62.

In accordance with some embodiments of the subject matter of the present application, a radially inward portion of each insert receiving slot 38 merges on one side thereof (i.e. the side of the insert receiving slot 38 that opens out to the rearward cutter portion side surfaces 28b) with a respective forward shank recess 60.

In accordance with some embodiments of the subject matter of the present application, in a direction along the body central axis B, the imaginary shank portion circle CS can intersect all the insert receiving slots 38. In particular, for any given for any given clamping portion (32), the imaginary shank portion circle CS can intersect the slot lower jaw abutment surface 44. The slot clamping member abutment surface 42 can be located radially outside the imaginary shank portion circle CS. The slot radial stop surface 46 can be located radially inside the imaginary shank portion circle CS. The slot key and resilience portions 50, 54 can be located radially inside the shank portion circle CS.

The cutter portion 26 further includes a flexibility recess 64 recessed in the forward cutter portion side surface 28a. Stated differently, the flexibility recess 64 is recessed relative to the forward cutter radial plane P'' and thus opens out to the forward cutter portion side surface 28a. Advantageously, the flexibility recess 64 increases the clamping forces applied on the cutting insert 24 by the clamping member 34.

As seen in FIG. 4, in accordance with some embodiments of the subject matter of the present application, the flexibility recess 64 can extend in the rearward direction $D_R$ into the shank portion 56. Thus, the flexibility recess 64 can extend beyond (i.e., past) the rear cutter radial plane P' in the rearward direction $D_R$. The flexibility recess 64 has a recess depth D measured in the rearward direction $D_R$ greater than the cutter portion width WC. Accordingly, the flexibility recess 64 can extend in the rearward direction $D_R$ past the entire extent of the slot lower jaw abutment surface 44. The flexibility recess 64 can be blind. That is to say, the flexibility recess 64 only opens out only to the forward cutter portion side surface 28a. The flexibility recess 64 can exhibit N-fold rotational symmetry about the body central axis B.

Referring to FIG. 5, in accordance with some embodiments of the subject matter of the present application, the flexibility recess 64 can include a recess base surface 66. The recess base surface 66 can connect the insert receiving slots 38. That is to say, the recess base surface 66 can extend to all the insert receiving slots 38. The recess base surface 66 can be oriented perpendicular to the body central axis B. The flexibility recess 64 can include a number N of recess peripheral wall surfaces 68. Each recess peripheral wall surface 68 can extend from the recess base surface 66 to the forward cutter portion side surface 28a between the slot peripheral surfaces 40 of two circumferentially adjacent insert receiving slots 38. The peripheral wall surface 68 limits the radially inner extent of the slot peripheral surface 40. The recess peripheral wall surfaces 68 can be oriented parallel to the body central axis B. The recess base surface 66 can intersect with each of the recess peripheral wall surfaces 68 at an intersection which forms a fillet 69.

In accordance with some embodiments of the subject matter of the present application, the flexibility recess 64 can be centrally located on the forward cutter portion side surface 28a. The flexibility recess 64 can be intersected by the body central axis B. Specifically, the body central axis B can intersect the recess base surface 66. The recess peripheral wall surfaces 68 can extend about the body central axis B.

As seen in FIG. 5, in accordance with some embodiments of the subject matter of the present application, in an end view of the slotting tool body 22 along the body central axis B, the slot lower jaw abutment surface 44 and the slot clamping member abutment surface 42 can converge towards each other in a direction towards the flexibility recess 64, defining an acute slot abutment angle β.

The flexibility recess 64 extends to (i.e., intersects) each of the insert receiving slots 38. Stated differently, the flexibility recess 64 connects the insert receiving slots 38 with each other. The insert receiving slots 38 are between the flexibility recess 64 and the chip gullet 33 on the cutter portion peripheral surface 30. Thus, the flexibility recess 64 does not adjoin the chip gullet 33 but rather is spaced apart therefrom. By virtue thereof, the cutter portion 26 is divided into a number N of cutter sub-portions 70. In a cross-sectional view taken in a median cutter radial plane P through both the flexibility recess 64 and the cutter portion peripheral surface 30, the cutter sub-portions 70 are spaced apart from each other. In accordance with some embodiments of the subject matter of the present application, two adjacent cutter sub-portions 70 can be spaced apart from each other by a respective insert receiving slot 38 and a portion of the flexibility recess 64. Each cutter sub-portion 70 can be defined circumferentially in a sequential order by a portion of the cutter portion peripheral surface 30, a portion of the slot peripheral surface 40 from a first insert receiving slot 38, one of the recess peripheral wall surfaces 68, and a portion of the slot peripheral surface 40 from a second insert receiving slot 38, the first and second insert receiving slot 38 being adjacent to each other.

Referring to FIG. 5, in accordance with some embodiments of the subject matter of the present application, the flexibility recess 64 can transition into each insert receiving slot 38 at a respective narrowing neck portion 72. In an end view of the slotting tool body 22 along the body central axis B, a linear line L extends between two adjacent cutter sub-portions 70 at the neck portion 72, and having a minimum dimension, can delimit the flexibility recess 64 and the insert receiving slot 38 from each other. The slot key portion 50 can be adjacent the linear line L. As best seen in FIG. 3, the flexibility recess 64 and the slot key portion 50 have the general shape of a star polygon with N corner vertices.

Each cutter sub-portion 70 can include a prong hole 31, for receiving a displacement prong 51a of an insertion key 52 when attaching the cutting insert 24 to the cutter portion 26, as described later in the description.

It is noted that, each clamping portions 32 spans over two adjacent (i.e. different) cutter sub-portions 70. Specifically, for any given clamping portion 32, the clamping member 34 and the lower jaw member 36 are located on two adjacent cutter sub-portions 70 and circumferentially face each other. In accordance with some embodiments of the subject matter of the present application, the stop member 39 and the resilient clamping member 34 can be located on the same cutter sub-portion 70.

Figure 8:
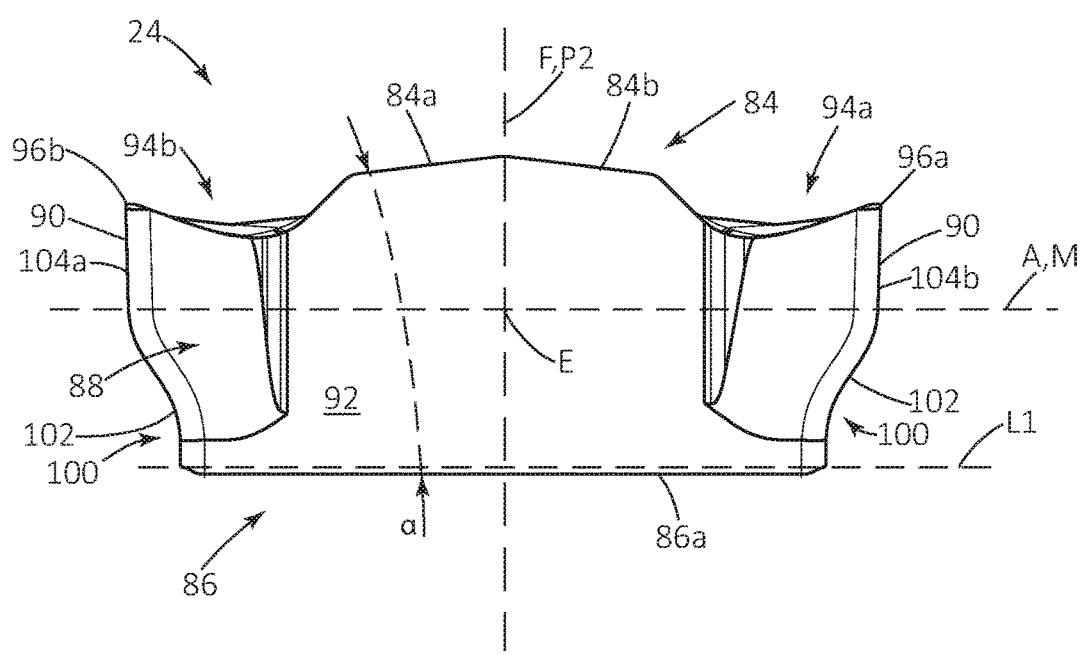
FIG. 8 is a side view of the cutting insert shown in FIG. 7.
Figure 9:
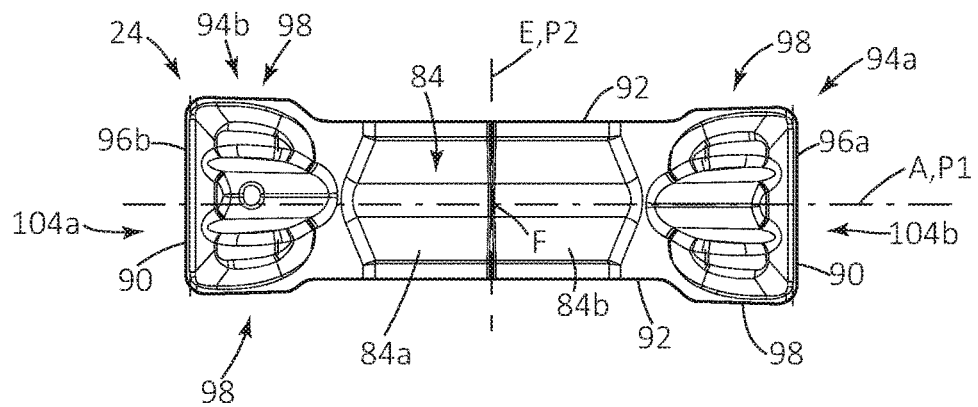
FIG. 9 is a top view of the cutting insert shown in FIG. 7.
Figure 10:
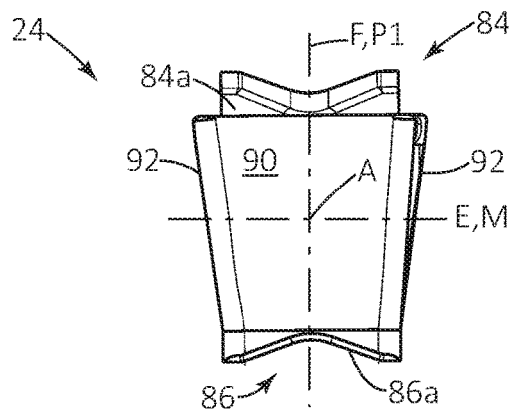
FIG. 10 is an end view of the cutting insert shown in FIG. 7.

Reference is now made to FIGS. 7 to 10, showing the cutting insert 24. The cutting insert 24 is longitudinally elongated in a direction that defines an insert longitudinal axis A. The cutting insert 24 includes opposing insert upper and lower surfaces 84, 86 and an insert peripheral surface 88 that extends therebetween. The insert upper and lower surfaces 84, 86 include insert upper and lower abutment surfaces 84a, 86a, respectively, for abutment with corresponding surfaces on the insert receiving slot 38. As seen in FIG. 8, in accordance with some embodiments of the subject matter of the present application, in a side view of the cutting insert 24 along the insert lateral axis E, the insert upper abutment surface 84a and the lower abutment surfaces 86a converge towards each other in a direction away from the cutting edge 96a forming an acute insert abutment angle α. The insert lower surface 86 can contain a linear insert imaginary line L1 parallel to the insert longitudinal axis A. Referring to FIG. 9, the insert upper and/or lower abutment surfaces 84a, 86a can have a prismatic shape that matches a shape of the slot clamping member abutment surface 42 and/or slot lower jaw abutment surface 44, respectively, in order to prevent displacement of the cutting insert 24 in the lateral direction of the cutting insert 24.

The insert peripheral surface 88 includes two opposing insert end surfaces 90 that connect the insert upper and lower surfaces 84, 86. The insert peripheral surface 88 includes two opposing insert side surfaces 92 that connect the insert upper and lower surfaces 84, 86. The insert longitudinal axis A intersects the insert end surfaces 90 and extends between the insert side surfaces 92 (FIG. 9) and also extends between insert upper and lower surfaces 84, 86 (FIG. 8). An insert lateral axis E extends perpendicular to the insert longitudinal axis A midway between the insert end surfaces 90 and intersects the two insert side surfaces 92, defining an insert lateral direction of the cutting insert 24. An insert central axis F extends perpendicular to the insert longitudinal axis A midway between the insert end surfaces 90 and intersects the insert upper and lower surfaces 84, 86. An insert median plane M contains the insert longitudinal axis A and the insert lateral axis E.

As seen in FIG. 9, the insert longitudinal axis A lays on an insert longitudinal plane P1 which contains the insert central axis F, passes midway between the insert side surface 92, and intersects both end surfaces 90. An insert central plane P2 perpendicular to the insert longitudinal plane P1 and also to the insert longitudinal axis A, contains the insert central axis F and the insert lateral axis E. In accordance with some embodiments of the subject matter of the present application, the cutting insert 24 can have 180° rotational symmetry about the insert central axis F. The cutting insert 24 may not be mirror symmetrical about the insert central plane P2 nor the insert longitudinal plane P1.

The cutting insert 24 includes a cutting portion 94a located at one end of the cutting insert 24. In accordance with some embodiments of the subject matter of the present application, the cutting insert 24 can further include one additional cutting portion 94b such that the cutting insert 24 includes two cutting portions 94a, 94b, an active cutting portion 94a (constituting the cutting portion 94a) and a non-active cutting portion 94b. The two cutting portions 94a, 94b are located at opposite ends of the cutting insert 24. Stated differently, the cutting insert 24 is double-ended and can be indexed by 180° rotation about the insert central axis F (i.e. the active cutting portion 94a becomes the non-active cutting portion 94b and vice versa). The two cutting portions 94a, 94b can be identical. It is understood in the following description that any feature that relates to a single cutting portion 94a can also relate to the other cutting portion 94b if present.

The cutting portion 94a includes a cutting edge 96a located at the cutting portion 94a. Specifically, the cutting edge 96a is formed at the intersection of the insert upper surface 84 and one of the two insert end surfaces 90. A portion of the insert end surface 90 adjacent the cutting edge 96a serves as a relief surface. Likewise, a portion of the insert upper surface 84 adjacent the cutting edge 96a serves as a rake surface. When the cutting insert 24 is releasably and resiliently clamped in the insert receiving slot 38, the cutting edge 96a of the active cutting portion 94a is located beyond the radial projection of the cutter portion 26 (i.e. beyond the imaginary circumscribed cutter portion circle CC). Preferably, such radial projection is no more than 1 mm. As seen in FIG. 9, the insert longitudinal plane P1 intersects the cutting edge 96a, that is, the cutting edge 96a extends on both sides of the insert longitudinal plane P1.

Each insert side surface 92 bulges outwardly at the cutting portion 94a. That is to say, the cutting portion 94a includes two insert lateral extensions 98 which project laterally in a direction away from the insert longitudinal plane P1 (i.e. perpendicular to the insert longitudinal plane P1), from opposite sides of the cutting insert 24. The cutting edge 96a extends onto the two insert lateral extensions 98. When a double-ended cutting insert 24 is retained in an insert receiving slot 38 the wide lateral extension 98 belonging to the non-active cutting portion 94b located at the radially inner portion of the insert receiving slot 38, protrudes into the forward shank recess 60. Thus, one function of the forward shank recess 60 is to accommodate, and thus provide clearance for, the inactive lateral extension 98.

The insert end surface 90 opposite the cutting portion 94a includes an insert recessed portion 100 having an insert key surface 102, configured for abutment with the displacement prong of the key (not shown) used for extracting the cutting insert 24 from the insert receiving slot 38. The insert key surface 102 is closer to the insert lower surface 86 than to the insert upper surface 84. In accordance with some embodiments of the subject matter of the present application, the insert key surface 102 can be located entirely below the insert median plane M. In a side view of the cutting insert 24, perpendicular to the insert longitudinal axis A (i.e. FIG. 8), the insert key surface 102 can be concavely curved.

In accordance with some embodiments of the subject matter of the present application, the insert end surface 90 opposite the cutting portion 94a can include an insert stop surface 104a, for contact with the slot radial stop surface 46. The insert stop surface 104a can be closer to the insert upper surface 86 than to the insert lower surface 86. The insert stop surface 104a can be planar. It is understood that in a double-ended cutting insert, such as seen the figures, both opposite end surfaces 90 are provided with a recessed portion 100 having a key surface 102. Likewise, the insert end surface 90 opposite the non-active cutting portion 94h can include an insert stop surface 104b, such that the cutting insert 24 includes two insert stop surfaces 104a, 104b, an active insert stop surface 104a (constituting the insert stop surface 104a), located at the non-active cutting portion 94b, and a non-active insert stop surface 104b located at the active cutting portion 94a.

Further in the configuration where the cutting insert 24 is double-ended, the cutting insert 24 includes an additional cutting edge 96b, such that the cutting insert 24 has two cutting edges, an active cutting edge 96a (constituting the cutting edge 96a), located at the active cutting portion 96a and a non-active cutting edge 96b located at the non-active cutting portion 94b. The insert upper surface 84 can include an additional insert upper abutment surface 84b such that the insert upper surface 84 includes two insert upper abutment surfaces, an active insert upper abutment surface 84a (constituting the insert upper abutment surface 84a) and a non-active insert upper abutment surface 84b. The two insert upper abutment surface 84a, 84b can be axially offset from each other, along the insert longitudinal axis A. The active insert upper abutment surface 84a can be located further from the active cutting portion 94a than the non-active insert upper abutment surface 84b. Each insert upper abutment surface 84a, 84b slopes towards the insert longitudinal axis A in a direction towards its closest cutting edge 96a, 96b, i.e., it slopes towards the insert median plane M. Thus, the two insert upper abutment surfaces 84a are inclined (i.e. non-parallel) with respect to each other.

Reverting to FIG. 1, in the assembled state of the rotary slot cutting tool 20, the cutting insert 24 is releasably and resiliently clamped in each of the insert receiving slots 38 by one of the resilient clamping members 34. The slot radial stop surface 46 abuts the insert stop surface 104a. The slot clamping member abutment surface 42 abuts the insert upper abutment surface 84a. The slot lower jaw abutment surface 44 abuts the insert lower abutment surface 86a. As is known, the slot clamping member abutment surface 42 and/or the slot lower jaw abutment surface 44 can include two or more spaced apart abutment sub-surfaces and thus each may not literally be a single abutment surface. In this non-limiting example shown in the drawings (e.g. FIG. 3), the slot lower jaw abutment surface 44 includes two longitudinally spaced apart abutment sub-surfaces. In the configuration where the cutting insert 24 is double-ended. The slot clamping member abutment surface 42 abuts the insert upper abutment surface 84a furthest from the active cutting edge 96a.

Figure 11:
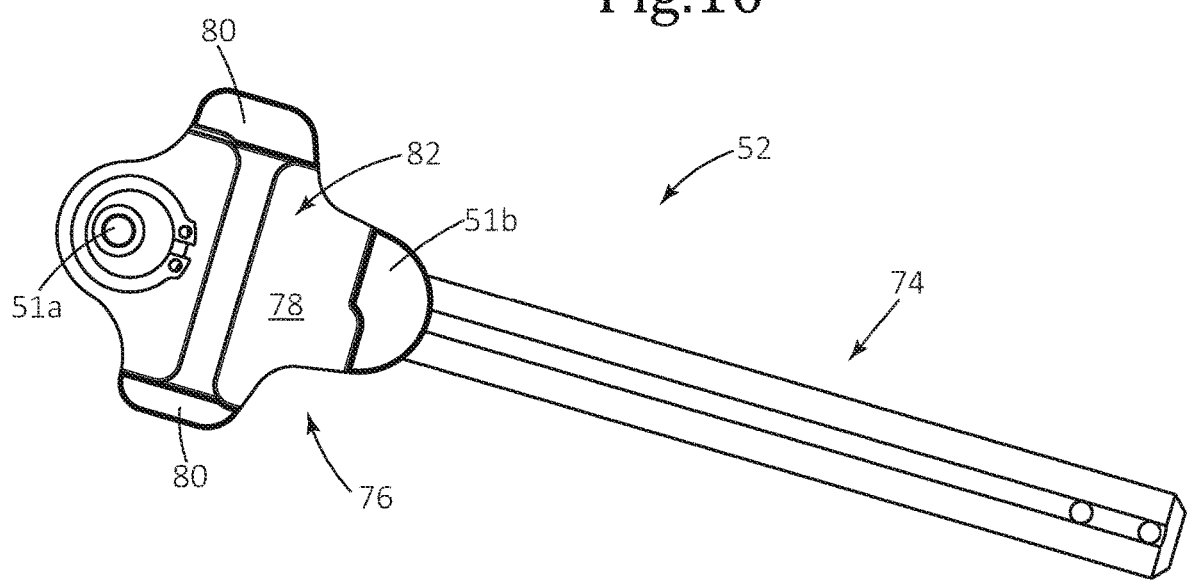
FIG. 11 is a perspective view of an insertion key.
Figure 12:
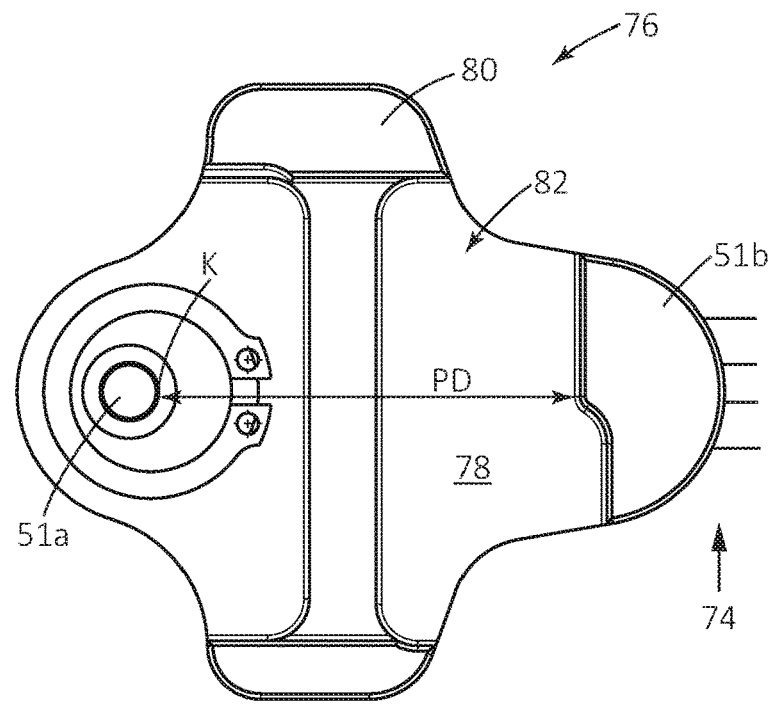
FIG. 12 is a detail of FIG. 11.

Referring to FIGS. 11 and 12, inserting the cutting insert 24 into the insert receiving slot 38 can be achieved with an insertion key 52. The insertion key 52 has a key handle 74. The insertion key 52 has a key head portion 76 connected to the key handle 74 and located at an opposite end of the insertion key 52. The key handle 74 is rotatable with respect to the key head portion 76 about a key rotation axis K. The key head portion 76 includes a key base surface 78. The insertion key 52 has two opposing fixed securing arms 80 projecting from the key base surface 78. The insertion key 52 also has a displaceable displacement prong 51a and a fixed insertion arm 51b, projecting from the key base surface 78 and which oppose each other. The two opposing key securing arms 80 and the displacement prong 51a and the insertion arm 51b are all spaced apart from each other to form a cutter portion receptacle 82.

Figure 13:
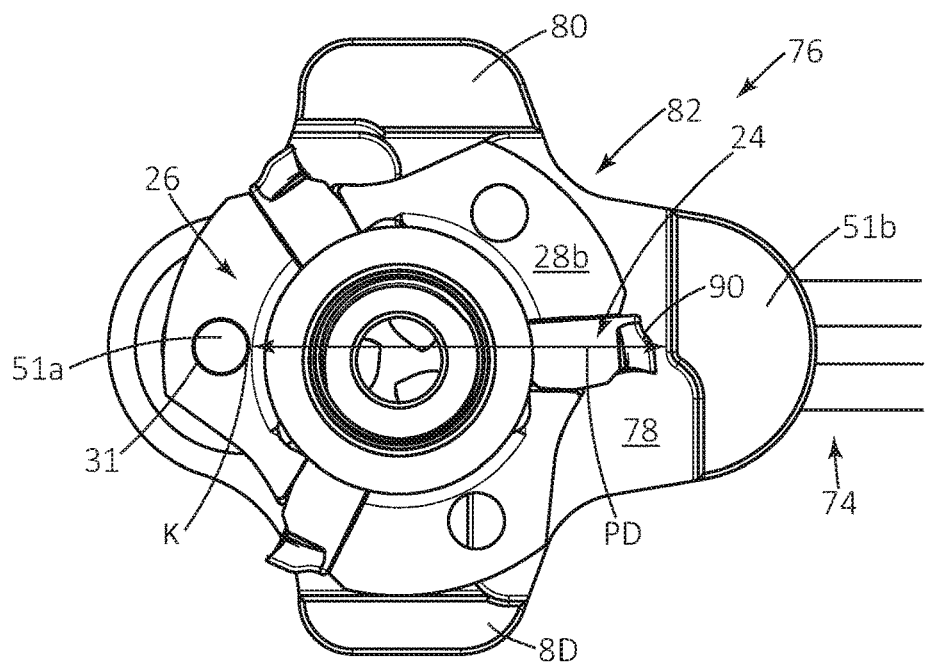
FIG. 13 is an analogous view shown in FIG. 12, with a cutter portion located in a cutter portion receptacle, prior to full insertion of one of the cutting inserts into one of the insert receiving slots.

Referring to FIG. 13, the cutting insert 24 is placed loosely in the insert receiving slot 38. The cutter portion 26 is inserted into the cutter portion receptacle 82, with the insertion arm 51b located next to the insert end surface 90 that is at the soon-to-be-active cutting portion 94a and the displacement prong 51a inserted into the prong hole 31 that is located on the cutter sub-portion 70 distal the insert receiving slot 38 into which the cutting insert 24 is being inserted. The forward cutting portion side surface 28a and the key base surface 78 face each other. The two securing arms 80 engage the cutter portion 26 at the periphery thereof. Rotation of key handle 74 about the key rotation axis K displaces the displacement prong 51a towards the insertion arm 51b so that a prong distance PD between the displacement prong 51a and the insertion arm 51b is reduced. The insertion arm 51b is initially brought into contact with the cutting insert 24 and subsequently urges the cutting insert 24 into the insert receiving slot 38 until it is fully inserted (i.e. until the slot radial stop surface 46 abuts the insert stop surface 104a) and firmly clamped by the clamping member 34.

It is noted that the flexibility recess 64 advantageously provides enough flexibility to the clamping members 34 so that they can be displaced enough to allow insertion of all cutting inserts 24 into their respective insert receiving slot 38 while the clamping members 34 are rigid enough to firmly clamp the cutting insert 24. This advantage is particularly relevant for small diameter tools (e.g. where the cutter portion diameter DC is less than or equal to 35 mm). In such small sized cutting tools, the number of insert receiving slots is restricted and it is typical that N is greater than or equal to two and less than or equal to nine (i e. N satisfies the condition: $2 \leq N \leq 9$). In a particular, N can be equal to three (i.e. N=3), and the cutter portion diameter DC can be approximately 20 mm. However, the invention is not limited to such range(s) and/or value(s).

Although the subject matter of the present application has been described to a certain degree of particularity, it should be understood that various alterations and modifications could be made without departing from the spirit or scope of the invention as hereinafter claimed.

What is claimed is:

1. A slotting tool body (22), having a body central axis (B) that defines opposite forward and rearward directions ($D_F$, $D_R$) and about which the slotting tool body (22) is rotatable in a rotational direction (R), the slotting tool body (22) comprising:
    a disc-like cutter portion (26) comprising:
        opposing forward and rearward cutter portion side surfaces (28a, 28b) and a cutter portion peripheral surface (30) extending therebetween; and
        a number N of angularly spaced apart clamping portions (32), where N is an integer greater than 1, each clamping portion (32) having:
            a peripherally disposed insert receiving slot (38) which opens out to the forward and rearward cutter portion side surfaces (28a, 28b) and the cutter portion peripheral surface (30); and
            a resilient clamping member (34) and a lower jaw member (36) which oppose each other and which are spaced apart by the insert receiving slot (38), the lower jaw member (36) having a slot lower jaw abutment surface (44) located thereon, the resilient clamping member (34) being configured to resiliently retain a cutting insert (24) in the insert receiving slot (38); and
    a shank portion (56) projecting rearwardly from the rearward cutter portion side surface (28b), the shank portion (56) comprising a shank peripheral surface (58) which extends circumferentially about the body central axis (B);
    wherein:
    the cutter portion (26) further comprises a single flexibility recess (64) recessed in the forward cutter portion side surface (28a) and extending to each and every one of the insert receiving slots (38); and
    in the rearward direction ($D_R$), the flexibility recess (64) extends past the entire extent of the slot lower jaw abutment surface (44).

2. The slotting tool body (22), according to claim 1, wherein:
    the cutter portion (26) is divided into a number N of cutter sub-portions (70); and
    in a median cutter radial plane (P) through both the flexibility recess (64) and the cutter portion peripheral surface (30), the cutter sub-portions (70) are spaced apart from each other.

3. The slotting tool body (22), according to claim 1, wherein the flexibility recess (64) exhibits N-fold rotational symmetry about the body central axis (B).

4. The slotting tool body (22), according to claim 1, wherein the flexibility recess (64) extends in the rearward direction ($D_R$), past the rearward cutter portion side surface (28b) and into the shank portion (56).

5. The slotting tool body (22), according to claim 1, wherein the flexibility recess (64) is intersected by the body central axis (B).

6. The slotting tool body (22), according to claim 1, wherein the flexibility recess (64) transitions into each insert receiving slot (38) at a respective narrowing neck portion (72).

7. The slotting tool body (22), according to claim 1, wherein the flexibility recess (64) is blind, and opens out only to the forward cutter portion side surface (28a).

8. The slotting tool body (22), according to claim 1, wherein:
    each insert receiving slot (38) is defined by an elongated slot peripheral surface (40) having ends that extend to the cutter portion peripheral surface (30); and
    the flexibility recess (64) comprises:
        a recess base surface (66) connecting the insert receiving slots (38); and
        a number N of recess peripheral wall surfaces (68), each of which extends from the recess base surface (66) to the forward cutter portion side surface (28a) between the slot peripheral surfaces (40) of two circumferentially adjacent insert receiving slots (38).

9. The slotting tool body (22), according to claim 8, wherein:
the recess base surface (66) is oriented perpendicular to the body central axis (B); and
the recess peripheral wall surfaces (68) are oriented parallel to the body central axis (B).

10. The slotting tool body (22), according to claim 9, wherein the recess base surface (66) intersects with each of the recess peripheral wall surfaces (68) at an intersection which forms a fillet (69).

11. The slotting tool body (22), according to claim 1, further comprising an annular groove (59) formed at an intersection of the rearward cutter portion side surface (28b) and the shank peripheral surface (58).

12. The slotting tool body (22), according to claim 1, wherein the cutter portion (26) and the shank portion (56) are integrally formed so that the slotting tool body (22) has a unitary, one-piece construction.

13. The slotting tool body (22), according to claim 1, wherein for any given clamping portion (32), the resilient clamping member (34) is arranged ahead of the lower jaw member (36) in the rotational direction (R).

14. The slotting tool body (22), according to claim 1, wherein:
the shank portion comprises (56) a number N of angularly spaced apart forward shank recesses (60) recessed in, and opening out to, the shank peripheral surface (58) adjacent to the cutter portion (26); and
a radially inward portion of each insert receiving slot (38) merges on one side thereof with a respective forward shank recess (60).

15. The slotting tool body (22), according to claim 14, wherein the resilient clamping member (34) of each clamping portion (32) is axially adjacent a respective forward shank recess (60).

16. The slotting tool body (22), according to claim 14, wherein the shank portion (56) further comprises a number N of peripherally disposed angularly spaced apart non-recessed forward shank portions (62) which circumferentially alternate with the forward shank recesses (60) and are axially adjacent the cutter portion (26).

17. The slotting tool body (22), according to claim 1, wherein, in a view along the body central axis (B):
an imaginary radius line extending between the body central axis (B) and the shank peripheral surface (58) defines a shank portion radius (RS) of an imaginary shank portion circle (CS) that is centered at the body central axis (B) and has a shank portion diameter (DS); and
the cutter portion (26) defines an imaginary circumscribed cutter portion circle (CC) that is centered at the body central axis (B) and that has a cutter portion diameter (DC).

18. The slotting tool body (22), according to claim 17, wherein, in a view along the body central axis (B), the imaginary shank portion circle (CS) intersects all the insert receiving slots (38).

19. The slotting tool body (22), according to claim 17, wherein:
each insert receiving slot (38) is defined by an elongated slot peripheral surface (40) comprising the slot lower jaw abutment surface (44) located on the lower jaw member (36); and
in said view along the body central axis (B), the imaginary shank portion circle (CS) intersects the slot lower jaw abutment surface (44).

20. The slotting tool body (22), according to claim 19, wherein:
the slot peripheral surface (40) further comprises a slot clamping member abutment surface (42) located on the resilient clamping member (34); and
in said view along the body central axis (B), the slot clamping member abutment surface (42) is located radially outside the imaginary shank portion circle (CS).

21. The slotting tool body (22), according to claim 19, wherein in an end view of the slotting tool body (22) along the body central axis (B), the slot lower jaw abutment surface (44) and the slot clamping member abutment surface (42) converge towards each other in a direction towards the flexibility recess (64), defining an acute slot abutment angle ($\beta$).

22. The slotting tool body (22), according to claim 1, wherein:
the cutter portion (26) is divided into a number N of cutter sub-portions (70);
each clamping portion (32) comprises a stop member (39) which is located circumferentially between the resilient clamping member (34) and the lower jaw member (36); and
the stop member (39) and the resilient clamping member (34) are located on the same cutter sub-portion (70).

23. The slotting tool body (22), according to claim 1, wherein:
N satisfies the condition: $2 \leq N \leq 9$;
the cutter portion (26) defines an imaginary circumscribed cutter portion circle (CC) that is centered at the body central axis (B) and that has a cutter portion diameter (DC); and
the cutter portion diameter (DC) is less than or equal to 35 mm.

24. The slotting tool body (22), according to claim 23, wherein:
N satisfies the condition: N=3; and
the cutter portion diameter (DC) is approximately equal to 20 mm.

25. A rotary slot cutting tool (20) comprising:
a slotting tool body (22) in accordance with claim 1; and
a cutting insert (24), releasably and resiliently clamped in each of the insert receiving slots (38) by one of the resilient clamping members (34).

26. The rotary slot cutting tool (20), according to claim 25, wherein:
the cutting insert (24) is longitudinally elongated in a direction defining an insert longitudinal axis (A), the cutting insert (24) comprising:
opposing insert upper and lower surfaces (84, 86) and an insert peripheral surface (88) extending therebetween, the insert peripheral surface (88) comprising two opposing insert end surfaces (90) connecting the insert upper and lower surfaces (84, 86) and two opposing insert side surfaces (92) also connecting the insert upper and lower surfaces (84, 86);
an insert longitudinal plane (P1) containing the insert longitudinal axis (A), passing between the insert side surfaces (92), and intersecting the insert upper and lower surfaces (84, 86) and also intersecting the opposite insert end surfaces (90); and
a cutting portion (94a) located at one end of the cutting insert (24), the cutting portion (94a) comprising a cutting edge (96a) formed at the intersection of the insert upper surface (84) and one of the two insert end surfaces (90); wherein:

the insert upper and lower surfaces (84, 86) comprises insert upper and lower abutment surfaces (84*a*, 86*a*), respectively;

the insert receiving slot (38) is defined by an elongated slot peripheral surface (40) comprising the slot lower jaw abutment surface (44) located on the lower jaw member (36);

the slot peripheral surface (40) further comprises a slot clamping member abutment surface (42) located on the resilient clamping member (34);

the slot clamping member abutment surface (42) abuts the insert upper abutment surface (84*a*); and the slot lower jaw abutment surface (44) abuts the insert lower abutment surface (86*a*).

27. The rotary slot cutting tool (20), according to claim 26, wherein:

the insert end surface (90) opposite the cutting portion (94*a*) further comprises an insert stop surface (104*a*) which is closer to the insert upper surface (84) than to insert lower surface (86), the insert stop surface (104*a*) being planar;

each clamping portion (32) comprises a stop member (39) which is located circumferentially between the resilient clamping member (34) and the lower jaw member (36);

the cutter portion (26) is divided into a number N of cutter sub-portions (70);

the stop member (39) and the resilient clamping member (34) are located on the same cutter sub-portion (70);

the slot peripheral surface (40) further comprises a slot radial stop surface (46) located on the stop member (39); and the slot radial stop surface (46) abuts the insert stop surface (104*a*).

28. The rotary slot cutting tool (20), according to claim 26, wherein:

the cutting insert (24) comprises an additional cutting portion (94*b*) such that the cutting insert (24) includes two cutting portions, an active cutting portion (94*a*) and a non-active cutting portion (94*b*), the two cutting portions (94*a*, 94*b*) being formed at opposite ends of the cutting insert (24);

the insert upper surface (84) includes an additional insert upper abutment surface (84*b*), such that the insert upper surface (84) includes two insert upper abutment surfaces, an active and non-active insert upper abutment surface (84*a*, 84*b*), the active insert upper abutment surface (84*a*) being located further from the active cutting portion (94*a*) than the non-active insert upper abutment surface (84*b*), with the slot clamping member abutment surface (42) abutting the active insert upper abutment surface (84*a*); and the insert end surface (84) at the active cutting portion (94*a*) includes an additional insert stop surface (104*b*), such that the cutting insert (24) includes two insert stop surfaces, an active and non-active insert stop surface (104*a*, 104*b*), the active insert stop surface (104*a*) being located at the non-active cutting portion (94*b*), with the slot radial stop surface (46) abutting the active insert stop surface (104*a*).

29. A slotting tool body (22), having a body central axis (B) that defines opposite forward and rearward directions ($D_F$, $D_R$) and about which the slotting tool body (22) is rotatable in a rotational direction (R), the slotting tool body (22) comprising:

a disc-like cutter portion (26), comprising:

opposing forward and rearward cutter portion side surfaces (28*a*, 28*b*) and a cutter portion peripheral surface (30) extending therebetween; and a number N of angularly spaced apart clamping portions (32), where N is an integer greater than 1, each clamping portion (32) having:

a peripherally disposed insert receiving slot (38) which opens out to the forward and rearward cutter portion side surfaces (28*a*, 28*b*) and the cutter portion peripheral surface (30); and a resilient clamping member (34) and a lower jaw member (36) which oppose each other and which are spaced apart by the insert receiving slot (38), the resilient clamping member (34) being configured to resiliently retain a cutting insert (24) in the insert receiving slot (38); and a shank portion (56) projecting rearwardly from the rearward cutter portion side surface (28*b*), the shank portion (56) comprising a shank peripheral surface (58) which extends circumferentially about the body central axis (B);

wherein:

the cutter portion (26) further comprises a single flexibility recess (64) recessed in the forward cutter portion side surface (28*a*) and extending to each and every one of the insert receiving slots (38);

the flexibility recess (64) is intersected by the body central axis (B);

the cutter portion (26) and the shank portion (56) are integrally formed so that the slotting tool body (22) has a unitary, one-piece construction and, at the body central axis (B), the flexibility recess (64) extends into the shank portion (56), is blind, and opens out only to the forward cutter portion side surface (28*a*);

the flexibility recess (64) transitions into each insert receiving slot (38) at a respective narrowing neck portion (72); and the flexibility recess (64) is spaced apart from a chip gullet (33) formed on the cutter portion peripheral surface (30).

30. The slotting tool body (22), according to claim 29, wherein:

the lower jaw member (36) has a slot lower jaw abutment surface (44) located thereon; and in the rearward direction ($D_R$), the flexibility recess (64) extends past the entire extent of the slot lower jaw abutment surface (44).

31. A slotting tool body (22), having a body central axis (B) that defines opposite forward and rearward directions ($D_F$, $D_R$) and about which the slotting tool body (22) is rotatable in a rotational direction (R), the slotting tool body (22) comprising:

a disc-like cutter portion (26), comprising:

opposing forward and rearward cutter portion side surfaces (28*a*, 28*b*) and a cutter portion peripheral surface (30) extending therebetween; and a number N of angularly spaced apart clamping portions (32), where N is an integer greater than 1, each clamping portion (32) having:

a peripherally disposed insert receiving slot (38) which opens out to the forward and rearward cutter portion side surfaces (28*a*, 28*b*) and the cutter portion peripheral surface (30); and a resilient clamping member (34) and a lower jaw member (36) which oppose each other and which are spaced apart by the insert receiving slot (38), the resilient clamping member (34) being configured to resiliently retain a cutting insert (24) in the insert receiving slot (38); and a shank portion (56) projecting rearwardly from the rearward cutter portion side surface (28*b*), the shank portion (56) comprising a shank peripheral surface (58) which extends circumferentially about the body central axis (B);

wherein:

the cutter portion (26) further comprises a single flexibility recess (64) recessed in the forward cutter portion side surface (28*a*) and extending to each and every one of the insert receiving slots (38);

the cutter portion (26) is divided into a number N of cutter sub-portions (70), each clamping portion (32) comprises a stop member (39) which is located circumferentially between the resilient clamping member (34) and the lower jaw member (36);

in a median cutter radial plane (P) through both the flexibility recess (64) and the cutter portion peripheral surface (30), the cutter sub-portions (70) are spaced apart from each other; and the stop member (39) and the resilient clamping member (34) are located on the same cutter sub-portion (70).

* * * * *